United States Patent [19]

Tsukihashi

[11] Patent Number: 5,802,026

[45] Date of Patent: Sep. 1, 1998

[54] DISK PLAYER FOR CONSTANT ANGULAR VELOCITY REPRODUCTION OF A DISK

[75] Inventor: Akira Tsukihashi, Ohra-gun, Japan

[73] Assignee: Sanyo Electric Co., Ltd., Osaka, Japan

[21] Appl. No.: 826,136

[22] Filed: Mar. 26, 1997

[30] Foreign Application Priority Data

Apr. 3, 1996 [JP] Japan ................... 8-081425

[51] Int. Cl.$^6$ ........................................... G11B 5/09
[52] U.S. Cl. ..................................... 369/48; 369/60
[58] Field of Search ........................... 369/32, 33, 47, 369/48, 50, 60, 124

[56] References Cited

U.S. PATENT DOCUMENTS

| | | |
|---|---|---|
| 5,425,014 | 6/1995 | Tsuyuguchi et al. ............. 369/54 X |
| 5,517,477 | 5/1996 | Sako ............................... 369/60 |
| 5,677,901 | 10/1997 | Iwamura ........................... 369/60 |

FOREIGN PATENT DOCUMENTS

| | | |
|---|---|---|
| 63-074171 | 4/1988 | Japan . |
| 5189885 | 7/1993 | Japan . |
| 6180845 | 6/1994 | Japan . |

Primary Examiner—Paul W. Huber
Attorney, Agent, or Firm—Loeb & Loeb LLP

[57] ABSTRACT

Demodulated data in a digital recording signal is initially stored in a buffer memory. Meanwhile, an error detection and correction processing circuit operates based on a clock that is set according to the maximum signal processing speed so that error detection and correction for the demodulated data is performed irrespective of the disk driving speed. When the writing of demodulated data to the buffer memory is halted, a re-reading is performed of a digital memory. This achieves an increase in angular velocity for driving the disk.

14 Claims, 2 Drawing Sheets

DISK PLAYER FOR CONSTANT ANGULAR VELOCITY REPRODUCTION OF A DISK

BACKGROUND OF THE INVENTION

1. Field of the Invention

This invention relates to a disk player for playing back digital recording signal that were recorded on a disk in a constant linear velocity format, and more particularly to a disk player designed for driving disks faster than a rated speed in order to increase transfer rates.

2. Description of the Related Art

In order to obtain playback data from a digital recording signal read from a disk, a known disk player configuration, such as that disclosed in Japanese Patent Laid-Open Publication No. Hei 5-189885, employs a bit clock that is synchronized with bits in the digital recording signal for performing signal processing operations on the digital recording signal.

In this disk player, the bit clock synchronizes naturally, even when the disk driving speed or the playback data transfer rate fluctuates. Therefore, playback data can be decoded without requiring strict control of the disk driving speed. For this reason, it is possible to perform signal processing operations on the digital recording signal of a constant linear velocity format disk, such as a CD format disk, by driving the disk at a constant angular velocity and performing demodulation of the digital recording signal.

When a constant linear velocity format disk is driven at a constant linear velocity, the disk's rotating speed differs significantly for the innermost and outermost tracks, a difference of 2.5 times the rated velocity for a CD format disk. Disk players are being developed for faster disk driving speeds of 4 times (4×) or 8 times (8×) the rated speed for scanning the digital recording signal on the disk at a speed faster than the rated speed, thereby increasing the data transfer rate.

In this type of disk player, the difference in rotating speeds for the innermost and outermost tracks for CD format disks is 10 times at 4× speed and 20 times at 8× speed.

However, signal processing circuits for performing signal processing of digital recording signals on these disks have a limited processing speed. At present, if a faster data transfer rate is desired, the maximum speed of the data transfer rate is limited by the error detection and correction circuit section because this section has the slowest signal processing speed in the signal processing circuit.

If a constant linear velocity format disk is driven at a constant angular velocity in a disk player that performs digital recording signal processing using the aforementioned bit clock, it is unnecessary to vary the disk driving speed when the scanning position on the disk is moved along the disk's radial direction. For this reason, once the scanning position on the disk is moved, scanning of the digital recording signal becomes possible and a reduction in access time can be achieved. Thus, in disk players that perform frequent random playback operations, such as CD-ROM compatible disk players that handle computer data, use of techniques for driving the aforementioned constant linear velocity format disk at a constant angular velocity is effective.

If a faster data transfer rate is to be designed for driving a constant linear velocity format disk at a constant angular velocity, the scanning speeds for the digital recording signal at the innermost and outermost tracks of the disk will differ. For this reason, a condition occurs where the data transfer rate within the performance range of a signal processing circuit's processing speed at the innermost track of the disk will exceed the performance range of the signal processing circuit's processing speed at positions further toward the outermost track. In this case, since the data transfer rate is limited by the error detection and correction circuit portion of the signal processing circuit, the disk driving speed in a constant angular velocity format must be set so that the data transfer rate at the outermost signal track on the disk falls within the possible signal processing range of the error detection and correction circuit section. Thus, a problem occurs that a faster data transfer rate can not be effectively designed for the inner disk tracks.

SUMMARY OF THE INVENTION

The object of this invention is to rotate a disk, which has been recorded in a constant linear velocity format, at a constant angular velocity, and to increase the data transfer rate at the inner disk tracks. This invention performs synchronous signal processing operations with a bit clock in the digital recording signal on the disk for demodulating the digital recording signal before the error detection and correction processing operation, and also stores the demodulated data of the digital recording signal into a buffer memory so that the demodulated data is initially stored in that buffer memory. A bit rate of the recording is in accordance with the disk driving speed. Meanwhile, the error detection and correction processing operation is performed in accordance with a clock that is set according to the possible maximum signal processing speed in order to perform error detection and correction of the demodulated data irrespective of the disk driving speed. Halting of writing of demodulated data to the buffer memory is detected, at which point the scanning position on the disk is returned so that a re-reading of the digital recording signal is performed for the demodulated data that was not written to the buffer memory. In this manner, the demodulation processing operation speed for the digital recording signal before the error detection and correction processing operation is made independent from the error detection and correction processing operation speed. The disk driving speed which necessitated keeping within the error detection and correction processing operable range, is expanded to the demodulation processing operable range for the digital recording signal before the error detection and correction processing operation, and, when a disk recorded in constant linear velocity format is driven at a constant angular velocity, the angular velocity of the disk driving speed is increased to keep within the performance range of the processing speed of the signal processing circuit at the outer disk track.

DETAILED DESCRIPTION OF THE PREFERRED EMBODIMENT

Figure 1:
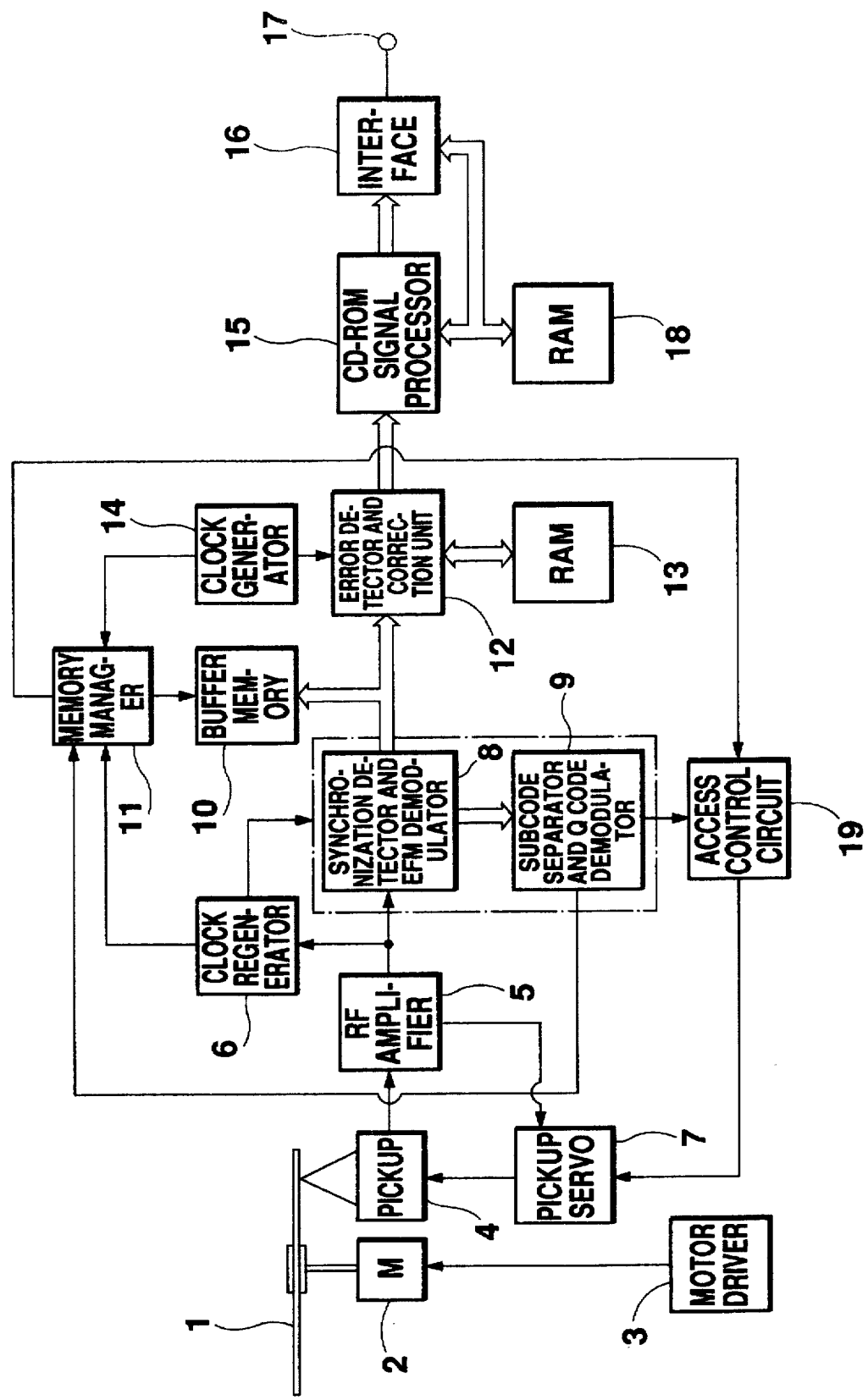
FIG. 1: Circuit block diagram showing an embodiment of this invention.

FIG. 1 is a circuit block diagram of a CD-ROM player showing an embodiment of the present invention. FIG. 1 shows a disk 1 in a CD format, a spindle motor 2 for rotating a disk 1, and a motor driving circuit 3 for driving the spindle motor 2.

A motor driving circuit 3 drives the disk 1 at a constant angular velocity, where the angular velocity is set for rotating the disk 1 at a high speed. The motor driving circuit 3 controls the drive spindle motor 2 so that the transfer rate of the demodulated data corresponding to the digital recording signal at the outermost track of the disk 1 exceeds the possible processing speed range for the signal processing system.

An optical pickup 4 emits a scanning beam of laser light for tracing the disk 1 to read the digital recording signal on disk 1. An RF amplifier 5 amplifies and shapes the wave of the RF signal of the digital recording signal read by the optical pickup 4. A clock regenerator circuit 6, comprising a PLL circuit, regenerates from the digital recording signal obtained through the RF amplifier 5, a bit clock that is synchronized to the bits in the digital recording signal. A pickup servo circuit 7 feeds back the output from the optical pickup 4 through the RF amplifier 5, which performs a focusing control to focus the scanning beam on the signal surface of the disk 1 and performs a tracking control to track the signal track of disk 1 with the scanning beam, and performs a thread advance control to advance the actual optical pickup 4 in a radial direction of the disk 1.

A synchronization detection and EFM demodulation circuit 8 detects frame synchronization signals, indicating the start of frames, from the digital recording signal that was wave-shaped by the RF amplifier 5 and performs an EFM demodulation of the digital recording signal. A subcode separation and Q code demodulation circuit 9 separates subcode signals from within the digital recording signal that has undergone an EFM demodulation by the synchronization detection and EFM demodulation circuit 8 and demodulates Q codes that are included in the subcode signals.

A first-in-first-out buffer memory 10 initially stores the demodulated data that was demodulated by the synchronization detection and EFM demodulation circuit 8. A memory management circuit 11 performs control operations to halt or resume the writing of demodulated data to the buffer memory 10. An error detection and correction circuit 12 fetches the demodulated data that was stored in the buffer memory 10 and performs a signal processing for error detection and error correction of the demodulated data. A first RAM 13 is used as a buffer for demodulated data sorting and error correction. A clock generator circuit 14 generates an operation clock for the error detection and correction circuit 12 and generates a reference clock having a crystal oscillation precision of a frequency set according to the maximum signal processing speed of the error detection and correction circuit 12.

The synchronization detection and EFM demodulation circuit 8 and the subcode separation and Q code demodulation circuit 9, which are enclosed in the dashed line in the figure, perform various types of signal processing with the bit clock that was regenerated by the clock regenerator circuit 6.

A CD-ROM signal processing circuit 15 performs a synchronization detection by further performing a digital signal processing adapted to the signal format of the CD-ROM disk on the demodulated data obtained through the error detection and correction circuit 12, and performs an error detection and error correction specific to the demodulated data compatible with the signal format of the CD-ROM disk. An interface 16 interfaces with a host computer (not shown) through a connector 17. A second RAM 18 is used in the digital signal processing by the aforementioned CD-ROM signal processing circuit 15 and is used for storing the CD-ROM data to be sent to the host computer through the interface 16 and the connector 17.

An access control circuit 19 controls the access operation by causing the optical pickup 4 to jump scan tracks on the disk 1.

The operation for FIG. 1 is described next. The digital recording signal recorded on disk 1 is scanned by the optical pickup 4, amplified and wave-shaped by the RF amplifier 5, and supplied to the synchronization detection and EFM demodulation circuit 8. Then, a frame synchronization signal is detected from the digital recording signal by the synchronization detection and EFM demodulation circuit 8 and an EFM demodulation is performed.

The subcode separation and Q code demodulation circuit 9 separates the subcode signal from the demodulated data that has undergone EFM demodulation by the synchronization detection and EFM demodulation circuit 8, and demodulates the Q code included in the subcode signal.

Further, the demodulated data, that has undergone EFM demodulation by the synchronization detection and EFM demodulation circuit 8, is sequentially written to the buffer memory 10 in a state where the frame synchronization signal and subcode signal have been removed under the management of the memory management circuit 11, and is sequentially read from buffer memory 10. The demodulated data that was read from the buffer memory 10 is sequentially transferred to the first RAM 13. The error detection and correction processing is performed on the demodulated data by the error detection and correction circuit 12 for every unit block for which error detection and correction processing is possible.

The error detection and correction processing is performed by the error detection and correction circuit 12. The digital signal processing compatible with the signal format of the CD-ROM disk is performed on the demodulated data that was demodulated up to a common range with the signal format of the CD-DA disk by the CD-ROM signal processing circuit 15 so that the synchronization detection and the error detection and correction specific to the signal format of the CD-ROM disk are performed.

The CD-ROM data that has undergone digital signal processing by the aforementioned CD-ROM signal processing circuit 15 is sent to the host computer through the interface 16 in response to a command from the host computer connected to the connector 17.

When performing a high-speed disk playback, the spindle motor 2 is driven at a constant angular velocity by the motor driving circuit 3 so that the disk 1 is driven at a predetermined constant rotating speed. In this case, a constant angular velocity is set for the disk driving speed so that the transfer rate of the demodulated data, which corresponds to the digital recording signal scanned from the outermost signal track of a disk having a minimum linear velocity (1.2 m/s) standardized to the signal format of CD-DA disks, essentially attains a maximum speed within the signal processing operable range. The maximum speed is set with an appropriate allowance added to the maximum speed limit of the signal processing operable range in the signal processing system before the error detection and correction operation and until writing to the buffer memory 10.

For example, if the essential maximum speed that is set in this manner is a data transfer rate equivalent to 20 times the rated linear velocity of the standard signal format of CD-DA disks, the disk 1 is driven at a constant angular velocity based on a rotating speed equivalent to 20 times the aforementioned rated velocity at the outermost signal track on a standard minimum linear velocity disk results in the disk being driven at a constant angular velocity. In this case, the disk 1 is driven at a constant angular velocity based on a rotating speed equivalent to 8 times the aforementioned rated velocity at the innermost signal track on the disk.

The digital recording signal can be scanned from a disk rotating in this manner. The synchronization detection and EFM demodulation circuit 8 and the subcode separation and Q code demodulation circuit 9 use, as an operation clock, the bit clock regenerated from the digital recording signal by the clock regenerator circuit 6 so that the respective signal processing operations are performed in the synchronization detection and EFM demodulation circuit 8 and the subcode separation and Q code demodulation circuit 9 while the data transfer rate varies with the changes in the disk's rotating speed.

On the other hand, the error detection and correction circuit 12 uses, as an operation clock, the reference clock generated by clock generator circuit 14, which is set at a frequency at which the error detection and correction circuit 12 is operated essentially at a maximum speed. This maximum speed is the maximum speed limit of the signal processing operable range in the error detection and correction circuit 12 added with an appropriate allowance. For this reason, the transfer rate of the demodulated data derived from the synchronization detection and EFM demodulation circuit 8 and the operating speed at which the error detection and correction circuit 12 performs error detection and correction do not coincide.

The essential maximum speed within the signal processing operable range in the error detection and correction circuit 12 is slower than the essential maximum speed within the signal processing operable range in the signal processing system before the error detection and error correction processing operation, and reaches, for example, a data transfer rate equivalent to 16 times the rated linear velocity for the signal format of CD-DA disks. For this reason, the operation processing speed of the error detection and correction circuit 12, which is faster compared to the transfer rate of the demodulated data derived from the synchronization detection and EFM demodulation circuit 8 at an inner track of the disk, becomes slower at an outer track of the disk.

In other words, the signal processing speed for the digital recording signal scanned from the disk is dictated by the scanning speed according to the disk's rotating speed at an inner track of the disk in a range less than the predetermined operation processing speed of the error detection and correction circuit 12 until a rotating speed is attained equivalent to a data transfer rate of 16 times the rated linear velocity, and also dictated by the signal processing operation speed of the error detection and correction circuit 12 at an outer track of the disk in a range greater than or equal to the predetermined operation processing speed of the error detection and correction circuit 12 after a rotating speed is attained equivalent to a data transfer rate of 16 times the rated linear velocity.

The write timing for the demodulated data to the buffer memory 10 and the read timing for the demodulated data from the buffer memory 10 are managed by the memory management circuit 11. The write timing for the demodulated data is synchronized with the transfer rate of the demodulated data derived from the synchronization detection and EFM demodulation circuit 8. The read timing for demodulated data is synchronized with the operation processing speed of the error detection and correction circuit 12. For this reason, at an inner disk track in a range less than the set operation processing speed of the error detection and correction circuit 12, the reading speed from the buffer memory 10 becomes faster than the writing speed to the buffer memory 10. As a result, the buffer memory 10 does not overflow in the steady state. At an outer disk track in a range greater than or equal to the set operation processing speed of the error detection and correction circuit 12, the reading speed from the buffer memory 10 becomes slower than the writing speed to the buffer memory 10, and thus, the buffer memory 10 does overflow.

When the overflow of the buffer memory 10 is detected by the memory management circuit 11, the memory management circuit 11 halts the writing of the demodulated data to the buffer memory 10 as well as supplies a signal indicating this halt to the access control circuit 19. Then, the access control circuit 19 performs an access operation with reference to an address code of the Q code demodulated by the subcode separation and Q code demodulation circuit 9. A re-reading of the digital recording signal is then performed for the demodulated data that was not previously written to the buffer memory 10 due to overflow. During this time, the reading of the demodulated data from the buffer memory 10 continues even in the state where the writing of demodulated data has halted so the amount of data stored in the buffer memory 10 decreases during the access operation period. After the access operation, the state changes to one where the writing of demodulated data to buffer memory 10 is resumed.

Although a Q code is completed after every 98 frames for a CD-format disk, the writing and reading of the demodulated data, to and from the buffer memory 10 can be managed in single frame units using the address code of the Q code and the number of frames from the frame synchronization signal. For this reason, the writing of demodulated data to the buffer memory 10 and the reading of demodulated data from the buffer memory 10 can be managed in single frame units, even if the re-reading of the digital recording signal has been performed. The writing of demodulated data to the buffer memory 10 resumes when the access operation completes and the demodulated data of the frame following the frame of the last demodulated data that has been written to buffer memory 10 is derived from the synchronization detection and EFM demodulation circuit 8. The demodulated data of the frame following the frame of the last demodulated data is written to the buffer memory 10.

For this reason, at an outer disk track, for which the transfer rate of the demodulated data derived from the synchronization detection and EFM demodulation circuit 8 is greater than or equal to the predetermined operation processing speed of the error detection and correction circuit 12, re-reading is performed of the digital recording signal corresponding to the demodulated data of the frame following the frame of the last demodulated data that has been written to the buffer memory 10 by the access operation each time an overflow occurs in the buffer memory 10. This enables the demodulated data to be processed for error detection and correction without omission by the error detection and correction circuit 12.

Therefore, demodulation processing and error detection and correction processing can be performed for a digital recording signal at any radius on a disk, and are dictated by the scanning speed for the digital recording signal according to the disk's rotating speed at an inner disk track where the transfer rate of the demodulated data derived from the synchronization detection and EFM demodulation circuit 8 is less than the predetermined operation processing speed of error detection and correction circuit 12, and dictated by the signal processing operation speed of the error detection and correction circuit 12 at an outer disk track where the transfer rate of the demodulated data derived from the synchronization detection and EFM demodulation circuit 8 is greater than or equal to the predetermined operation processing speed of error detection and correction circuit 12. Since an access operation is performed each time the buffer memory 10 overflows at an outer disk track where the transfer rate of the demodulated data derived from the synchronization detection and EFM demodulation circuit 8 is greater than or equal to the predetermined operation processing speed of the error detection and correction circuit 12, a time loss due to the access operation causes a drop in the essential transfer rate of the demodulated data. Since the drop in the data transfer rate is proportional to the frequency of the access operations, it increases as the scanning position for the digital recording signal moves towards outer disk tracks.

Figure 2:
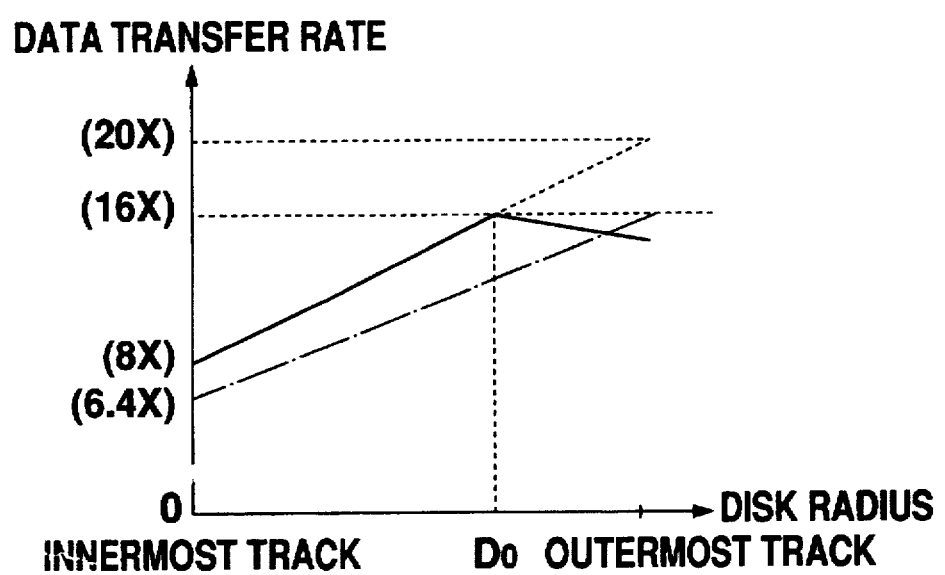
FIG. 2: Graph illustrating a change in characteristics of the data transfer rate in this invention.

In other words, if the relationship between the scanning position for the digital recording signal on the disk and the data transfer rate is illustrated in a graph as shown by the solid line in FIG. 2, the data transfer rate increases from inner to outer track in proportion to an increase in the disk's rotating speed until disk diameter D0 where the transfer rate of the demodulated data derived from the synchronization detection and EFM demodulation circuit 8 is equal to the [set] predetermined operation processing speed of the error detection and correction circuit 12. The data transfer rate for a track outside disk diameter D0 decreases as the frequency of access operations increases toward the outer disk track.

However, even if a decrease in the data transfer rate associated with the access operation occurs, the average data transfer rate for the overall disk in a disk player having the configuration just described can be substantially increased in speed compared to the average data transfer rate (indicated by the dashed line in FIG. 2) for the overall disk when the driving speed at a constant angular velocity for the disk is set so that the data transfer rate at the outermost disk track falls within the signal processing operable range of the error detection and correction circuit 12.

The frequency of access operations is directly related to the memory capacity of the buffer memory 10. Since the access operation frequency can be decreased if the memory capacity is increased, the memory capacity to be used for the buffer memory 10 is selected by balancing the data transfer rate and the cost.

Incidentally, if the buffer memory 10 has a 32 k-bit memory capacity, the disk is rotated at a constant angular velocity of 20 times the rated linear velocity for the data transfer rate at the outermost disk track. Thus, it is necessary to re-read the digital recording signal at a frequency of approximately 4 times per 3 rotations in the vicinity of the outermost disk track, so that 20×¾=15, namely, the playback of the digital recording signal is possible at approximately 15 times the rated linear velocity at the outermost disk track.

In this case, a rotating speed equivalent to 8 times the rated linear velocity at the outermost disk track results in the disk being driven at a constant angular velocity. Thus, if the data transfer rate of the predetermined operation processing speed of the error detection and correction circuit 12 is 16 times the rated linear velocity, the change in the data transfer rate is shown by the numeric values enclosed in parentheses in FIG. 2.

As shown in FIG. 2, the transfer rate of the demodulated data derived from the error detection and correction circuit 12 is not constant. However, this creates no problem in devices, such as CD-ROM players which are connected to a host computer and configured to initially load input data into the buffer RAM, or in devices having a memory in a stage after the error detection and correction circuit 12, such as the second RAM 18 in FIG. 1.

In order to handle disks where changes in the data transfer rate, such as of audio data or video data, may pose a problem, a function designed to increase the speed of the data transfer rate based on this invention can be optionally halted, or a memory can be provided to initially store the demodulated data derived from the error detection and correction circuit 12 so that the transfer rate of the demodulated data read from this memory can be kept constant.

In this specification, all references to a constant angular velocity are intended to denote the driving of disks for rotation at an average constant rotating speed, and not necessarily at a strictly constant angular velocity.

As described above, this invention initially stores the demodulated data of the digital recording signal into the buffer memory while performing an error detection and correction processing operation based on a clock that is set according to the maximum speed possible for the signal processing. The error detection and correction of the demodulated data are performed irrespective of the disk driving speed. The digital recording signal corresponding to the demodulated data that was not written to the aforementioned buffer memory is re-read when the writing of the demodulated data to the buffer memory was halted. As a result, the error detection and correction processing operation speed and the demodulation processing operation speed for the digital recording signal before the error detection and correction processing operation can be made independent. Also, when driving a disk recorded in a constant linear velocity format at a constant angular velocity, the angular velocity for driving the disk can be increased so that the signal processing speed is kept within the performance range of the processing speed of the signal processing circuit at the outer disk track.

Since demodulation of digital recording signals is possible even by driving a disk recorded in a constant linear velocity format at a constant angular velocity according to this invention, it is not necessary to vary the speed of the spindle motor with the access operations. This results in an advantage obviating measures to handle heat generation of the spindle motor as well as an advantage where a low torque motor or a motor having brushes can be used for the spindle motor.

Furthermore, since this invention performs an access operation to return the scanning position on disk when an overflow of the buffer memory occurs, advantages include that the memory capacity of the buffer memory can be used efficiently and that control for performing the access operation can be easily and reliably set.

While there has been described what is at present considered to be preferred embodiments of the invention, it will be understood that various modifications may be made thereto, and it is intended that the appended claims cover all such modifications as fall within the true spirit and scope of the invention.

What is claimed is:

1. A disk player for reproducing a digital recording signal on a disk that has been digitally recorded in a constant linear velocity format, the disk player comprising:

a pickup device for reading the digital recording signal from the disk;

a clock generator for retrieving a bit clock from the digital recording signal;

a demodulation circuit for demodulating the digital recording signal read by the pickup device from the disk and outputting demodulated data in response to the bit clock;

a buffer memory for storing the demodulated data;

a memory management circuit for controlling access by the demodulated data to the buffer memory in response to the bit clock;

an access control circuit for performing an access operation and providing a disk scanning position to the pickup device to re-read the digital recording signal corresponding to an unwritten portion of the demodulated data when the memory management circuit halts the writing of the demodulated data to the buffer memory;

an error detection and correction circuit for fetching demodulated data stored in said buffer memory and performing error detection and error correction of the demodulated data; and a clock generator circuit for generating an operation clock for the error detection and correction circuit the operation clock being set according to a maximum speed possible for signal processing by the error detection and correction circuit, wherein the demodulation processing operation of digital recording signals by said demodulation circuit and the write operation of demodulated data to said buffer memory are synchronously performed with the bit clock so that the demodulated data is written to said buffer memory in response to changes in a scanning speed for the digital recording signal and that said error detection and correction circuit is responsive to the operation clock from said clock generator circuit.

2. A player according to claim 1, wherein said memory management circuit halts writing of the demodulated data to the buffer memory when the buffer memory overflows and signals the access control circuit to perform the access operation to provide the disk scanning position.

3. A player according to claim 1, wherein the disk is driven at a constant angular velocity so that the demodulated data corresponding to the digital recording signal scanned from the outermost signal track of the disk is transferred faster than a signal processing rate of the error detection and correction circuit.

4. A disk player according to claim 1, wherein the disk scanning position from the access control circuit is determined in accordance with a writable buffer memory which is available for storing the demodulated data, the writable buffer memory being used for storing the demodulated data not written due to an overflow of the buffer memory.

5. A signal processing circuitry for disk players for reproducing signal data recorded on a disk the signal processing circuitry comprising:

a pickup device for reading the signal data from the disk;

a bit clock regenerator circuit for regenerating a bit clock from the signal data which changes according to a playback speed of the disk;

a demodulation circuit for demodulating the signal data into demodulated data in response to the bit clock;

a buffer memory for sequentially storing the demodulated data received from the demodulation circuit;

a reference clock output circuit for outputting a reference clock of a constant frequency;

a data processing circuit for processing the demodulated data read from the buffer memory in response to the reference clock;

a memory management circuit operable in response to the bit clock and the reference clock for inhibiting the writing of the demodulated data to the buffer memory according to the amount of the demodulated data that has not yet been read in the buffer memory;

an access control circuit for providing a control signal to the pickup device when the writing of data to the buffer memory was halted by the memory management circuit, the data that was not written is discarded, and data identical to the discarded data is again read from disk, wherein storage of the demodulated data to said buffer memory is performed in response the bit clock; and processing of data in the data processing circuit is performed in response the reference clock.

6. A signal processing circuitry according to claim 5, wherein said disk stores the signal data in a constant linear velocity format.

7. A signal processing circuitry according to claim 6, wherein said data processing circuit performs error detection and error correction processing with the demodulated data.

8. A signal processing circuitry according to claim 7, wherein said memory management circuit inhibits writing to the buffer memory when an amount of data not yet read from the buffer memory is greater than or equal to a predetermined amount.

9. A signal processing circuitry according to claim 8, wherein signal data read from said disk is data read by controlling the disk at a constant angular velocity.

10. A signal processing circuitry according to claim 9, wherein said reference clock has a frequency that is set according to the maximum speed that signal processing can be performed in said data processing circuit.

11. A signal processing circuitry according to claim 5, wherein said buffer memory is a first-in-first-out memory.

12. A signal processing circuitry according to claim 5, wherein the access control circuit outputs a control signal for re-reading the signal data in frame units.

13. A disk player for reproducing data recorded on a disk, the disk player comprising:

a pickup for reading data from a disk;

a bit clock regenerator circuit for regenerating a bit clock from the data, the bit clock being changed according to the playback speed;

a reference clock output circuit for outputting a reference clock of a constant frequency;

a demodulation circuit for demodulating the data read from the disk by the pickup into demodulated data in response to the bit clock;

a buffer memory for sequentially storing the demodulated data obtained from the demodulation circuit in response to the bit clock;

a data processing circuit for processing the demodulated data read from the buffer memory in response to the reference clock;

a memory management circuit for inhibiting the writing of data to the buffer memory according to the amount of data that has not yet been read from the buffer memory in response to both the bit clock and the reference clock;

an access control circuit for controlling the data reading position of said pickup so that, when the writing of data to memory was halted by the memory management circuit, the data that was not written is discarded, and data identical to the discarded data is again read from the disk.

14. A method for reproducing data recorded on a disk, comprising the steps of:

provide a disk containing encoded data recorded in a constant linear velocity format, wherein the disk is rotated at a constant angular velocity;

reading the data recorded on the disk in a constant angular velocity state;

regenerating a bit clock from the data read from the disk, the bit clock being changed according to the playback speed;

demodulating the data in response to the bit clock and outputting demodulated data;

storing the demodulated data in a buffer memory;

providing a reference clock which is independent from the bit clock;

reading the demodulated data from the buffer memory in response to the reference clock to detect and correct errors in a error detection and correction circuit;

controlling the buffer memory in response to both the bit clock and the reference clock;

re-reading the disk in response to an overflow condition in the buffer memory so that a portion of the demodulation data which was being written into the buffer memory is re-read from the disk and stored in the buffer memory in the absence of the overflow condition, wherein the overflow condition results when a transfer rate of the data that was read is faster than a processing speed of the the error detection and correction circuit.

* * * * *